US009476458B2

(12) United States Patent
Mola et al.

(10) Patent No.: US 9,476,458 B2
(45) Date of Patent: Oct. 25, 2016

(54) PAIR OF RADIAL FLANGED BEARINGS WITH ROLLING BODIES

(71) Applicants: Roberto Mola, Turin (IT); Riccardo Restivo, Turin (IT); Gianpiero Scaltriti, Turin (IT)

(72) Inventors: Roberto Mola, Turin (IT); Riccardo Restivo, Turin (IT); Gianpiero Scaltriti, Turin (IT)

(73) Assignee: AKTIEBOLAGE SKF, Gothenburg (SE)

( * ) Notice: Subject to any disclaimer, the term of this patent is extended or adjusted under 35 U.S.C. 154(b) by 0 days.

(21) Appl. No.: 14/743,329

(22) Filed: Jun. 18, 2015

(65) Prior Publication Data

US 2015/0369293 A1  Dec. 24, 2015

(30) Foreign Application Priority Data

Jun. 20, 2014  (IT) .............................. TO2014A0496

(51) Int. Cl.
| F16C 43/04 | (2006.01) |
| F16C 35/06 | (2006.01) |
| F16C 35/04 | (2006.01) |
| F16C 35/077 | (2006.01) |
| F16C 19/54 | (2006.01) |
| F16C 33/58 | (2006.01) |
| F16C 19/06 | (2006.01) |
| F16H 57/021 | (2012.01) |

(52) U.S. Cl.
CPC ............. F16C 35/061 (2013.01); F16C 19/54 (2013.01); F16C 33/586 (2013.01); F16C 35/045 (2013.01); F16C 35/077 (2013.01); F16C 19/06 (2013.01); F16C 2226/76 (2013.01); F16H 57/021 (2013.01)

(58) Field of Classification Search
CPC .... F16C 19/54; F16C 35/045; F16C 35/061; F16C 35/077; F16C 2226/76
USPC ................................... 384/537, 585
See application file for complete search history.

(56) References Cited

U.S. PATENT DOCUMENTS

| 3,605,516 A * | 9/1971 | Hausinger ............... F16C 19/54 74/401 |
| 6,279,231 B1 * | 8/2001 | Beyfuss ................. F16C 19/54 29/521 |
| 6,408,519 B1 * | 6/2002 | Beyfuss ................. F16C 19/54 29/521 |
| 6,652,150 B2 * | 11/2003 | Buchheim ............... F16C 19/54 29/898.07 |
| 8,091,240 B2 * | 1/2012 | Katougi ................ F16C 33/586 29/505 |
| 8,398,311 B2 * | 3/2013 | Beyfuss ................. F16C 19/54 384/537 |

(Continued)

FOREIGN PATENT DOCUMENTS

| DE | 102010035781 A1 | 8/1969 |
| DE | EP 1717470 A2 * | 11/2006 ............. F16C 19/54 |

(Continued)

Primary Examiner — Phillip A Johnson
(74) Attorney, Agent, or Firm — Bryan Peckjian; SKF USA Inc. Patent Dept.

(57) ABSTRACT

A pair of radial flanged bearings with rolling bodies, each of the bearings comprising a radially outer ring, radially confined by an external surface, a radially inner ring, co-axially and internally assembled, with respect to the outer ring, a row of rolling bodies, which is interposed between the outer ring and the inner ring, to allow the relative rotation of the two rings and a flange steadily fixed to the outer rings. The correspondent outer rings are provided with an assembly groove, which is obtained along said external surface. The flange is not in one piece with the outer rings, but is detachable from the outer rings in correspondence of the assembly grooves.

4 Claims, 2 Drawing Sheets

(56) References Cited

U.S. PATENT DOCUMENTS

| | | | |
|---|---|---|---|
| 8,485,731 B2 * | 7/2013 | Beyfuss | F16C 19/54 384/537 |
| 2011/0222809 A1 * | 9/2011 | Beyfuss | F16C 19/54 384/548 |

FOREIGN PATENT DOCUMENTS

| | | | | |
|---|---|---|---|---|
| DE | 6911539 U | | 3/2012 | |
| DE | 102010046155 A1 | * | 3/2012 | F16C 35/045 |
| DE | 102010053337 A1 | * | 6/2012 | F16C 35/045 |
| DE | 102011055656 A1 | * | 5/2013 | F16C 35/045 |
| FR | 2831623 A1 | | 5/2003 | |
| SE | DE 10355407 B3 | * | 5/2005 | B29C 45/14467 |
| SE | EP 1731778 A2 | * | 12/2006 | F16C 19/54 |
| SE | DE 102010061914 A1 | * | 5/2012 | F16C 35/045 |

* cited by examiner

US 9,476,458 B2

PAIR OF RADIAL FLANGED BEARINGS WITH ROLLING BODIES

CROSS REFERENCE TO RELATED APPLICATIONS

This is a Non-Provisional Patent Application, filed under the Paris Convention, claims the benefit of Italy Patent (IT) Application Number TO2014A000496 filed on 20 Jun. 2014 (20.06.2014), which is incorporated herein by reference in its entirety.

TECHNICAL FIELD

The present invention relates to a pair of radial flanged bearings having rolling bodies.

BACKGROUND ART

Flanged radial bearings having rolling bodies are known. They comprise an outer ring and an inner ring coaxial with each other, a ring of rolling bodies interposed between the two rings to allow the relative rotation of the two rings and a flange, which is integral with the outer ring and is made of one piece and of the same material of the outer ring itself. Since the flange described above is integral with the outer ring, the use, better, the flexibility of use of the bearing is limited because some different applications may require flanges of different characteristics in terms of shape or material, but outer and inner rings having same performance and technical features.

Therefore, while being able to use the same bearing, for many applications requiring, however, different flanges, it is necessary to equip the production channels of the bearings in such a way as to produce at least the outer ring and the flange depending on the type of application.

A similar modus operandi does not work properly considering the ever increasing need for standardization of the greater number of components, savings in production, and flexibility of these products and their production channels.

Same problems are found in the case in which there is a pair of flanged bearings, whose typical application is in transmissions (for example, automotive transmissions) and more generally in the case of shafts having parallel axes.

BRIEF SUMMARY OF THE PRESENT INVENTION

Aim of the present invention is to realize a pair of radial flanged bearings having rolling bodies, which can be widely used and overcomes the above mentioned inconveniences.

This and other purposes and advantages, which will be better understood hereafter, are reached according to an embodiment by a pair of radial flanged bearings with rolling bodies, having the characteristics as in the enclosed independent claim.

Further embodiments of the invention, preferred and/or particularly advantageous, are described according to the characteristics as in the enclosed dependent claims.

BRIEF DESCRIPTION OF THE DRAWINGS

The invention will be now described by reference to the enclosed drawings, which show some non-limitative embodiments, namely.

DETAILED DESCRIPTION OF THE PRESENT INVENTION

Figure 1:
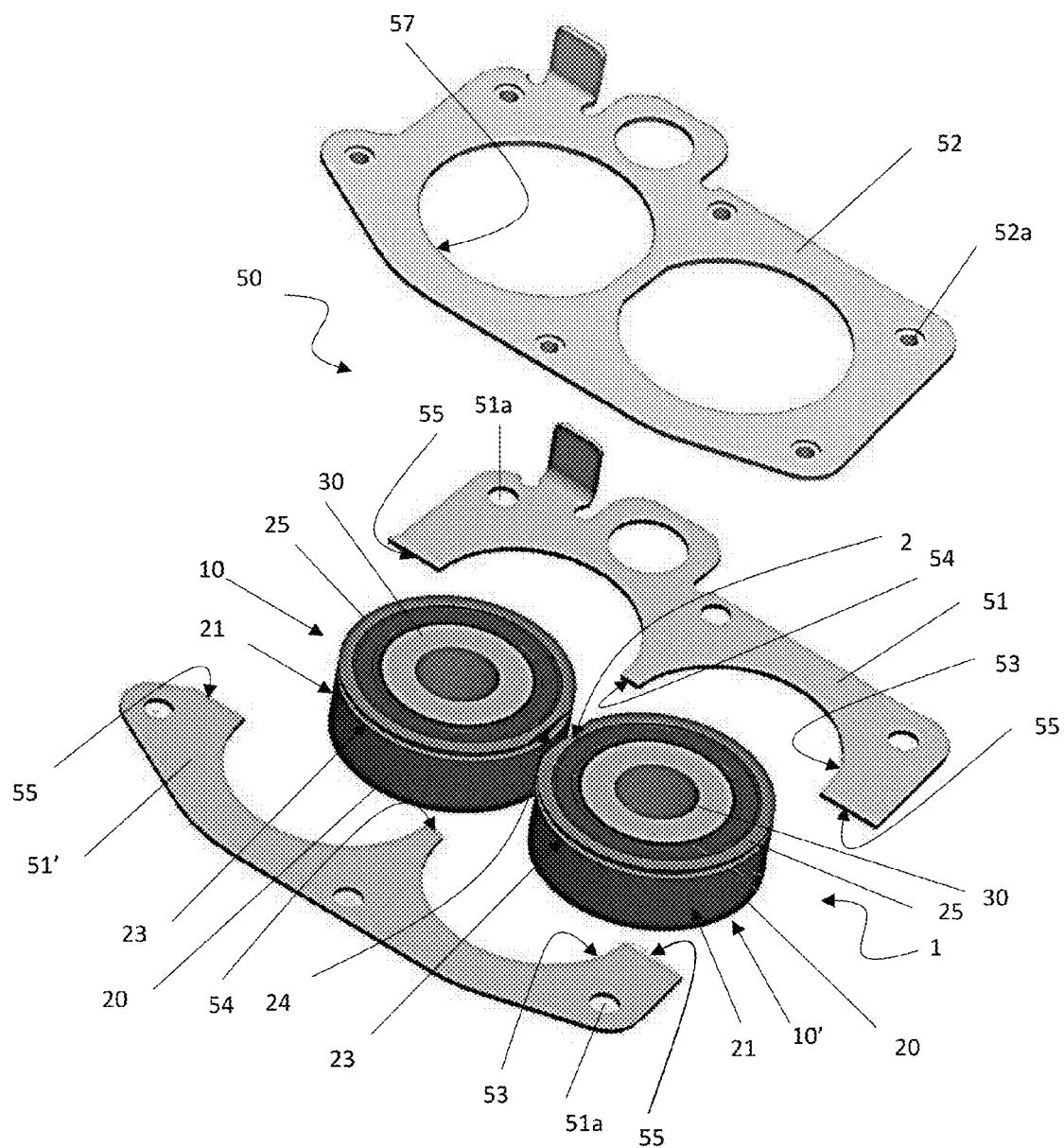
FIG. 1 is an exploded perspective view of a preferred embodiment of the pair of flanged radial bearings having rolling bodies.
Figure 2:
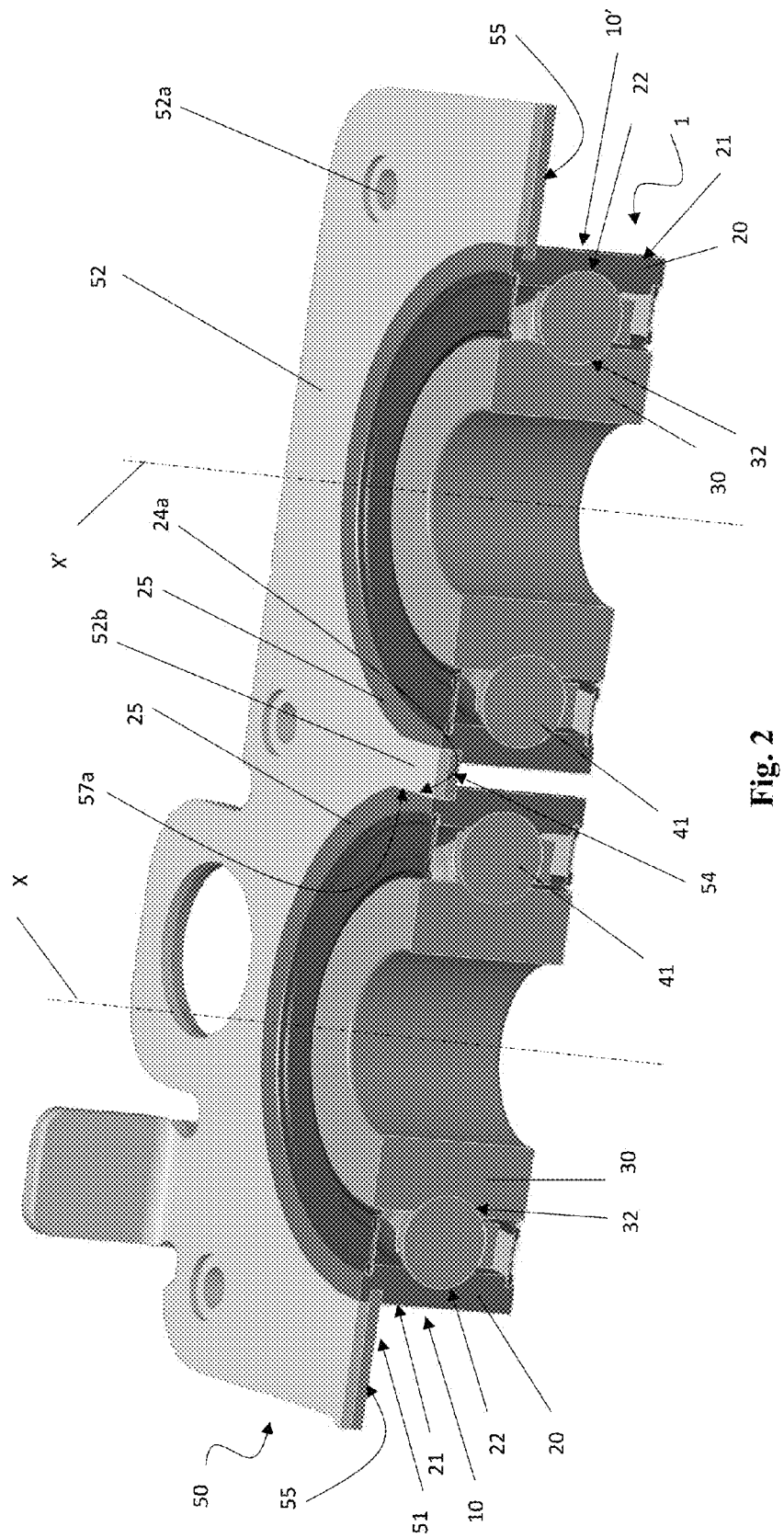
FIG. 2 is a perspective section of the pair of bearings of FIG. 1.

With reference to FIGS. 1 and 2, a pair of radial flanged bearings is referenced as a whole with 1. The bearings are provided with rolling bodies 41, in this example spheres.

The pair of bearings 1 comprises a first bearing 10 which has an axis of rotation X and a second bearing 10' which has an axis of rotation X'. The bearings 10, 10' may have same or different dimensions. The example in FIGS. 1 and 2 shows a pair of bearings, having same dimensions. For this reason, from now on the characteristics which will be described will get the same reference for each bearing. Each of the bearings 10, 10' includes:
 an outer ring 20 radially bounded by an outer surface 21 and provided with an inner raceway 22;
 an inner ring 30 mounted coaxial and internal to the outer ring 20 and provided with an outer raceway 32;
 a row of rolling bodies 41, arranged inside the raceways 22, 32 to allow the relative rotation between the outer rings 20 and the corresponding inner rings 30.

For the purpose of mounting the pair of bearings 1 to external mechanical elements, for example, to a housing of a transmission unit, the pair of bearings 1 also comprises a flange 50, which is integral with the outer rings 20 and radially extends towards outside of the outer surface 21 and transversely to the axes X, X'. The flange 50 is not an integral flange with the outer rings 20, namely it is not made in one piece and also of the same material of the outer rings 20, but is assembled in a disengageable way, with the outer rings 20 in correspondence with an assembly groove 23, which is formed in each outer ring 20 through the outer surface 21 and identifies, on the same outer surface 21, an annular assembly edge 24. The annular assembly edge 24 has an axial dimension substantially equal to, but not less than an axial dimension of the groove 23 and is axially delimited, on an axially inner end of each outer ring 20, by the groove 23 itself and on an axially outer portion of the outer rings 20, by a front surface 25 of the outer rings 20, transverse to the axes X, X'.

As we will better see in the following description, since the flange 50 is assembled in a detachable way by the outer rings 20, it is possible to use the same outer rings 20 together with the related inner rings 30 for different applications which need flanges 50 of different sizes, simply by assembling to the outer rings 20, the flange 50 which is more appropriate for the type of application. In other words, the production channel of the bearings 10, 10' may be always the same, regardless of the specific application of the bearings themselves, and at the end of the process will be sufficient to assemble to the pair of bearings 1 a flange 50 dedicated to the specific application: this leads not only obvious economic savings, but also a streamlining of production procedures, as well as a wider standardization of the production itself.

The flange 50 comprises:
 engagement means 51, 51' comprising two semi-annular plates 51, 51', provided with respective edges 53, radially internal and comprising two substantially semi-circular portion, such as the semi-annular plates 51, 51' are one another independent and are partially inserted into the assembly grooves 23 for anchoring the flange 50 to the outer rings 20, and locking means 52 comprising an annular plate 52, limited in the radially inner direction by a pair of substantially circular profiles, axially disposed behind the two semi-annular plates 51, 51' to lock the same semi-annular plates 51, 51' within the assembly grooves 23.

The two semi-annular plates 51 are disposed on opposite sides of the axes X, X' and the outer rings 20, may present the same form or, as in the example of FIGS. 1 and 2, be of a different form depending of the specific application, and are inserted inside the assembly grooves 23 by means of the respective radially inner edges 53. Each semi-annular plate 51, 51' has a thickness of axial dimensions equal to the dimensions of an axial thickness of the assembly grooves 23, and is provided with respective support end surfaces 54 and 55. The end surfaces 54 and 55 support each semi-annular plate 51, 51', are arranged along a same diametral plane transverse to the surface 25, and are facing and in contact with the end surfaces 54 and 55 supporting the other semi-annular plate 51, 51', thus ensuring the stability of the assembly of the two semi-annular plates 51, 51' within the groove 23.

In particular, the edges 53 of each semi-annular plate 51, 51' are inserted into the groove 23 preventing any axial movement of the two semi-annular plates 51, 51'. Being respectively arranged at the center and at opposite ends of its semi-annular plate 51, 51' and being arranged in contact with the end surfaces 54 and 55 of the other plate, the end surfaces 54 and 55 prevent any relative circumferential movement of each semi-annular plate 51, 51' relative to the other semi-annular plate. The edges 53, as well as a bottom surface of the groove 23 have a cylindrical shape, and allow the semi-annular plates 51, 51' to rotate, but together, around the axes X, X' allowing for adjustments of the position of the same semi-annular plates 51, 51' during assembly.

The annular plate 52 is provided with a pair of central through holes 57 and is keyed on the outer surface 21 of the outer ring 20, namely, is keyed on the edge 24 in a position axially close to the two semi-annular plates 51, 51'.

Moreover, both edges 24, both the central holes 57 are provided with respective flat portions 24a and 57a, anti-rotational, which are engaged with each other to prevent rotation of the annular plate 52 with respect to the outer rings 20, namely, to prevent the rotation also of the semi-annular plates 51, 51' with respect to the outer rings 20.

In other words, thanks to the engagement of the two semi-annular plates 51, 51' in the groove 23, the locking of the two semi-annular plates 51, 51' with the annular plate 52 and the mutual engagement of the two flat portions 24a and 57a, the flange 50 appears to be completely blocked in the outer ring 20 not having any degree of freedom either along the X axis or around the axis X itself.

As also shown in FIG. 2, for the purposes of assembling the bearings 10, 10' with the above-mentioned external mechanical elements, both the semi-annular plates 51, 51' and the annular plate 52 are provided with respective through holes 51a and 52a, where the through holes 51a of the semi-annular plates 51 are aligned with the through holes 52a of the annular plate 52. The holes 51a and 52a are uniformly distributed about the axes X, X' and the total number of holes 51a and holes 52a varies with the specific application: in the embodiment illustrated in the appended figures, as an example, each semi-annular plate 51, 51' is provided with three holes 51a and the plate 52 is provided with six holes 52a.

The annular plate 52 has an axial thickness of dimensions equal to the axial dimensions of the edge 24 so that, when placed close to the two semi-annular plates 51, 51', one of its free side face 52b, or a face thereof opposite to the one close to the two semi-annular plates 51, 51', is arranged in a position coplanar with the front surface 25 of the outer rings 20.

As regards the construction materials of both the semi-annular plates 51, 51' and the annular plate 52, these can be freely selected regardless from steel for bearings of which can be made the outer rings 20 and inner rings 30. In particular, both metallic materials and plastic materials or combinations thereof may be chosen from depending on the mechanical stresses that the flange 50 and the bearing 10, 10' will have to bear.

From the above it is clear that the adoption of a flange 50 assembled as described considerably widen the use of the pair of bearings 1 and allows to standardize the production of the rings 20 and 30 regardless of end use of the bearings 10, 10' with considerable savings in terms of time and production costs.

Also the axial dimensions of the semi-annular plates 51, 51' and the annular plate 52, which in the present embodiment are substantially similar, can be varied depending on the uses of the pair of flanged bearings 1 described above. As already noted, the possibility to assemble the flange 50 to the outer rings 20 and the particular technical execution of the flange 50 itself allow a wide range of configurations of the pair of bearings 1.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A pair of radial flanged bearings with rolling bodies, each of the bearings comprising:
   a radially outer ring, radially confined by an external surface;
   a radially inner ring, co-axially and internally assembled, with respect to the outer ring;
   a row of the rolling bodies, wherein the row of the rolling bodies is interposed between the outer ring and the inner ring to allow the relative rotation of the inner ring and the outer ring; and
   a flange steadily fixed to the outer rings;
   an assembly groove provided with each of the correspondent outer rings, wherein the assembly groove is obtained along said external surface,
   wherein the flange is not in one piece with the outer rings, but is detachable from the outer rings in correspondence of the assembly grooves,
   the flange comprises an engagement feature, wherein the engagement feature is partially inserted in the assembly grooves to engage the flange to the outer rings;
   a locking component, for locking the engagement feature inside the assembly grooves, wherein the locking component is axially close to the engagement feature;

the locking component comprising an annular plate provided with a pair of central through holes and assembled on the external surface of the outer rings; the annular plate being axially disposed behind two semi-annular plates and steadily fixed to both semi-annular plates, wherein the assembly groove, on the external surface of the outer ring, defines an annular assembly edge, on which the annular plate is assembled; the annular assembly edges and the pair of central through holes of the annular plate being provided with correspondent flattenings, which are anti-rotational and engage each other to avoid the rotation of the annular plate, with respect to the radially outer rings.

2. The pair of flanged bearings according to claim 1, wherein the engagement feature comprise two semi-annular plates, which are independent of each other, provided with correspondent radially inner edges and comprising two substantially semi-circular portions, which are inserted inside said assembly grooves.

3. The pair of flanged bearings according to claim 2, wherein each semi-annular plate is provided with support end surfaces, the support end surfaces of each semi-annular plate being exposed and in contact with the support end surfaces of the other semi-annular plate.

4. The pair of flanged bearings according to claim 3, wherein the semi-annular plates and the annular plate are provided with correspondent through holes, the through holes of the semi-annular plates being axially aligned with the through holes of the annular plate.

\* \* \* \* \*